United States Patent [19]

Klimek

[11] 3,826,283
[45] July 30, 1974

[54] INVERSION VALVE
[75] Inventor: Boleslaw Klimek, Des Plaines, Ill.
[73] Assignee: The Berg Manufacturing Company, Des Plaines, Ill.
[22] Filed: May 29, 1973
[21] Appl. No.: 364,307

[52] U.S. Cl............................... 137/627.5, 303/56
[51] Int. Cl....................... F16k 31/12, B60t 13/68
[58] Field of Search..... 137/596.18, 596.14, 596.17, 137/625.66, 625.6, 627.5; 303/6 A, 52, 54; 251/63.5, 63.6, 22, 63.4, 62; 91/62, 630

[56] References Cited
UNITED STATES PATENTS

| 3,181,917 | 5/1905 | Dobrikin et al........... 137/627.5 X |
| 3,399,932 | 9/1968 | Alfieri et al...................... 303/56 X |
| 3,399,933 | 9/1968 | Alfieri et al................. 137/627.5 X |
| 3,525,555 | 8/1970 | Meyer et al...................... 303/56 X |
| 3,752,190 | 8/1973 | Brake.............................. 137/627.5 |

Primary Examiner—Alan Cohan
Assistant Examiner—Robert J. Miller
Attorney, Agent, or Firm—Kinzer, Plyer, Dorn & McEachran

[57] ABSTRACT

An inversion valve for use in a vehicle air brake system includes a valve member which maintains communication between a source of pressure and an air brake as long as pressure is maintained in both primary and secondary air systems. If the primary air system should suffer a reduction in pressure, the valve member closes communication between the tank and the air brake and opens an exhaust port to exhaust the air pressure in the brake, thereby causing the brake to operate.

11 Claims, 2 Drawing Figures

PATENTED JUL 30 1974  3,826,283

INVERSION VALVE

SUMMARY OF THE INVENTION

The present invention relates to inversion valves for use in vehicle air brake systems and has particular relation to such a valve which causes operation of an air brake when the primary vehicle air system loses pressure.

A primary purpose of the invention is a valve of the type described including means for balancing a piston with air pressure from two different systems to maintain communication between an air tank and an air brake.

Another purpose is a valve of the type described including a piston having spaced seal members thereon, with one seal member being effective to control communication between the inlet and outlet ports and the other seal member being effective to control communication with an exhaust port.

Another purpose is a simply constructed reliably operable valve suitable for use in a vehicle air brake system.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
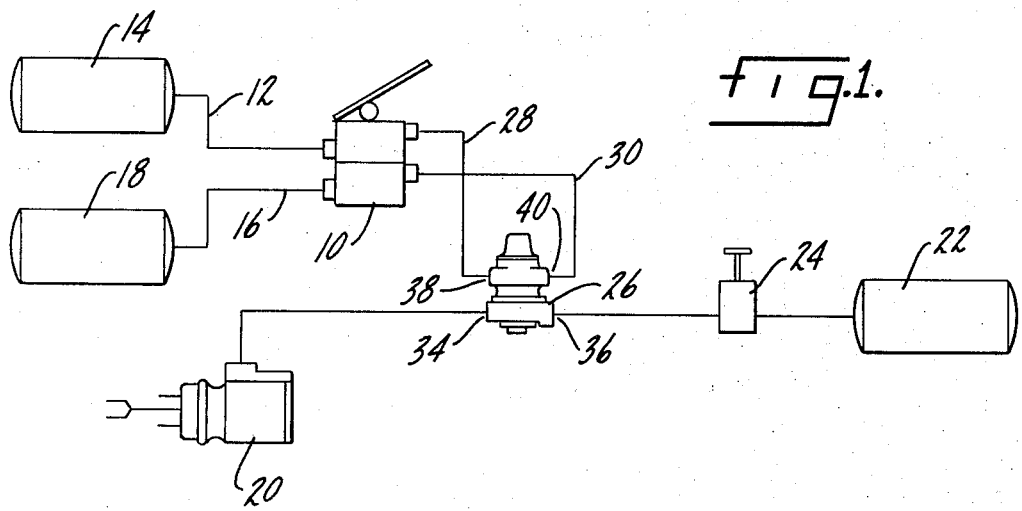
FIG. 1 is a diagrammatic illustration of a portion of a vehicle air brake system.

In FIG. 1 a dual foot application valve is indicated at 10 and is connected by a line 12 to a primary air tank 14. A line 16 connects the valve 10 to a secondary or emergency tank 18. An air brake cylinder is indicated at 20 and is of the type that uses air pressure to maintain the brakes in an off position. Air pressure is used to compress a spring-biased diaphragm, with a reduction in air pressure causing the brakes to be operated. An air tank 22, which normally may be a part of the primary air system, is connected by a valve 24 to an inversion valve 26. The inversion valve 26 is connected by a line 28 to the primary outlet of the valve 10 and by a line 30 to the secondary or emergency outlet of the valve 10.

The inversion valve 26 includes a housing 32 having an outlet port 34 which will be connected to the brake 20 as illustrated in FIG. 1, and an inlet 36 which will be connected to the air tank 22. Inlets 38 and 40 are respectively connected by lines 28 and 30 to the valve 10.

Positioned within the housing 32 is a first piston 42 having a central passage 44 connected to an exhaust port 46 which is controlled by a conventional flapper valve 48. The piston 42 carries a seal member 50 at its inward end and a second seal member 52 intermediate its opposite ends. A coil spring 54 surrounds an inwardly-extending portion 88 of the housing and is seated upon the housing at the outward end of portion 88 to bias piston 42 inwardly towards an annular valve seat 56 integrally formed with the housing.

Figure 2:
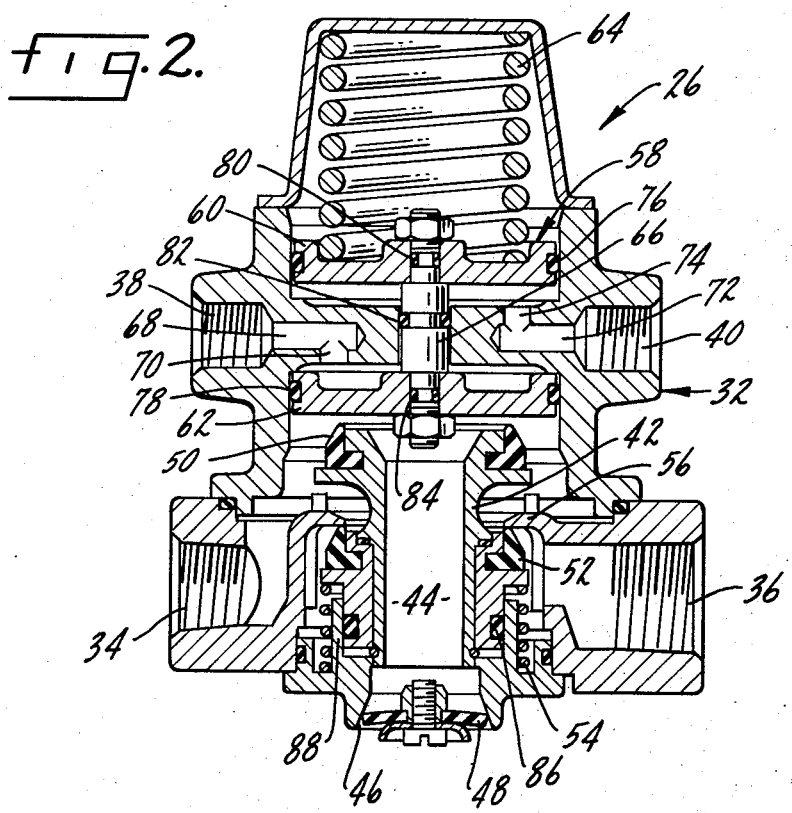
FIG. 2 is an axial section through the inversion valve of FIG. 1.

Movable within the housing is a second piston 58 having an upper piston portion 60 and a lower piston portion 62. A coil spring 64 seated against the housing biases piston 58 and its piston portions 60 and 62 inwardly toward the first piston 42. A stud or the like 66 fastens the piston portions 60 and 62 together and maintains said piston in spaced relation as illustrated in FIG. 2.

Inlet port 38 opens into a passage 68 having a downwardly directed portion 70 in communication with the upper surface of lower piston portion 62. In like manner, air inlet 40 is in communication with a passage 72 having an upwardly-directed portion 74 which is in communication with lower surface of upper piston portion 60.

The structure is completed by various seal rings performing conventional sealing functions. Upper piston portion 60 has an outer seal ring 76 sealing with the housing and lower piston portion 62 has an outer seal ring 78, also sealing with the housing. Fastener 66 mounts seal rings 80, 82 and 84 at its upper, intermediate and lower portions respectively.

The first piston or lower piston 42 has an annular seal ring 86 which is in sealing contact with the upwardly-extending cylindrical portion 88 of the housing 32.

Under normal operating conditions, when both the primary and secondary air systems are at full pressure, piston 58 will be balanced by the generally equal and oppositely-directed air pressures applied from inlet ports 38 and 40. Thus, spring 64 will urge piston 58 in an inward direction until lower piston portion 62 closes upon seal 50, thus closing off the exhaust passage 44. Movement of piston 58 caused by spring 64 will move piston 42 in an inward direction, thus moving seal ring 52 off of its seat 56 to open communication between the air inlet 36 and the air outlet 34. The vehicle air brakes will be maintained in an off condition due to air pressure from tank 22 applied to the air brake 20.

If primary air should either be lost or there should be a reduction in pressure in the primary air system, the air pressure applied through port 38, passage 68 and passage portion 70 will be reduced, causing the pressure applied from the secondary air inlet 40 to move piston 58 in an outward direction against the force of spring 64. Piston 58 will then be moved away to the position shown, thus opening communication between the exhaust passage 44 and exhaust port 46 and the air outlet 34. At the same time, spring 54 will urge the first piston 42 in an inward direction to cause the seal 52 to seat against its seat 56, thus closing communication between the outlet 34 and the inlet 36. The pressure in air brake 20 will be exhausted and the spring-operated brake will function to apply the vehicle brakes.

Although the operation has been described in connection with what may be termed a large reduction in the primary air system, or an absolute loss in the primary system, it should be understood that in actual practice the piston 58 will also be moved in accordance with differences between the primary and secondary systems. Thus, the piston 58 will modulate the air applied from tank 22 to the brake 20 in accordance with the difference between the primary and secondary air pressures.

Whereas the preferred form of the invention has been shown and described herein, it should be realized that there may be many modifications, substitutions and alterations thereto.

The embodiments of the invention in which an exclusive property or privilege is claimed are defined as follows:

1. An inversion valve for use in an air brake system including a housing, inlet, outlet and exhaust ports in said housing, a valve seat intermediate said inlet and outlet ports and controlling communication between said inlet and outlet ports, and a spring-biased first piston urged toward a closing position with said valve seat, second and third air inlet ports in said housing adapted to be connected to separate air pressure sources, a second piston in said housing, a valve seat on said first piston controlling communication with said exhaust port, and spring means biasing said second piston to a closing position with said first piston valve seat to close communication with said exhaust port, with said second piston moving, said first piston away from said intermediate valve seat to open communication between said inlet and outlet ports, said second piston having means forming spaced generally equal and opposite air pressure responsive areas, passage means connecting said second inlet port with one of said spaced areas and said third inlet port with the other of said spaced area, such that a change in air pressure at one of said second and third inlets will cause said second piston to move away from said first piston and first piston valve seat.

2. The structure of claim 1 further characterized in that said intermediate valve seat is formed by portions of said housing.

3. The structure of claim 1 further characterized in that said second piston includes spaced piston portions, with each of said areas being on one of said portions, said passage means being positioned between said spaced piston portions.

4. The structure of claim 3 further characterized in that said spring means is seated against one of said spaced piston portions.

5. The structure of claim 1 further characterized by and including an exhaust passage connected to said exhaust port and generally axially located in said first piston.

6. The structure of claim 5 further characterized in that said first piston valve seat is located at the inward end of said first piston.

7. The structure of claim 6 further characterized in that said first piston includes a seal ring, intermediate its opposite ends, arranged for sealing contact with said intermediate valve seat.

8. The structure of claim 7 further characterized in that said first piston valve seat includes a seal member.

9. The structure of claim 8 further characterized in that said intermediate valve seat is positioned between said seal ring and said seal member.

10. The structure of claim 1 further characterized by and including a sleeve extending into said housing and aligning said first piston within said housing.

11. The structure of claim 10 further characterized by a spring surrounding said sleeve for biasing said first piston.

* * * * *